US012744476B2

(12) United States Patent
Blackman et al.

(10) Patent No.: US 12,744,476 B2
(45) Date of Patent: Sep. 22, 2026

(54) STORED ENERGY RELEASE TRIGGERED BY PIEZOELECTRIC ELEMENT

(71) Applicant: Mission Systems Davenport Inc., Davenport, IA (US)

(72) Inventors: Don Blackman, Bradenton, FL (US); Brian Ford, Bettendorf, IA (US)

(73) Assignee: Mission Systems Davenport Inc., Davenport, IA (US)

(*) Notice: Subject to any disclaimer, the term of this patent is extended or adjusted under 35 U.S.C. 154(b) by 0 days.

(21) Appl. No.: 18/670,256

(22) Filed: May 21, 2024

(65) Prior Publication Data

US 2026/0012108 A1 Jan. 8, 2026

Related U.S. Application Data

(63) Continuation of application No. 18/229,951, filed on Aug. 3, 2023, now abandoned, which is a continuation of application No. 18/093,699, filed on Jan. 5, 2023, now abandoned, which is a continuation of application No. 17/521,318, filed on Nov. 8, 2021, now abandoned, which is a continuation of application No. 16/921,074, filed on Jul. 6, 2020, now abandoned, which is a continuation of application No. 16/736,450, filed on Jan. 7, 2020, now abandoned, which is a continuation of application No.

(Continued)

(51) Int. Cl.

| | |
|---|---|
| ***H02N 2/02*** | (2006.01) |
| ***B64D 17/30*** | (2006.01) |
| ***B64D 17/38*** | (2006.01) |
| *A44B 11/25* | (2006.01) |

(52) U.S. Cl.

CPC ............. *H02N 2/026* (2013.01); *B64D 17/30* (2013.01); *B64D 17/38* (2013.01); *A44B 11/2569* (2013.01)

(58) Field of Classification Search

CPC ........ H02N 2/026; B64D 17/30; B64D 17/38; A44B 11/2569

See application file for complete search history.

(56) References Cited

U.S. PATENT DOCUMENTS 3,744,102 A * 7/1973 Gaylord ................. B64D 17/38 24/603
4,555,831 A * 12/1985 Otzen .................. B60R 22/321 280/801.1
4,637,101 A * 1/1987 Fiedler .................. B64D 17/38 244/122 R

* cited by examiner

*Primary Examiner* — David M Upchurch
(74) *Attorney, Agent, or Firm* — Katherine H. McGuire, Esq.; Woods Oviatt Gilman LLP

(57) ABSTRACT

A stored energy release comprises an actuatable member slidably received within a housing. The actuatable member has an extended orientation wherein a portion of the actuatable member extends outwardly from the housing and a retracted orientation wherein the actuatable member resides within the housing. A biasing member is located between the actuatable member and the housing biases the actuatable member to the retracted orientation. A shaft is within the housing with the actuatable member configured for sliding movement along the shaft. A retaining member is located between the actuatable member and the shaft. The retaining member maintains the actuatable member in the extended orientation whereby potential energy is stored within the biasing member. A piezoelectric element selectively engages the retaining member to disable the retaining member and release the stored potential energy within the biasing member to place the actuatable member in the retracted orientation.

10 Claims, 5 Drawing Sheets

Related U.S. Application Data

16/546,644, filed on Aug. 21, 2019, now abandoned, which is a continuation of application No. 15/936,750, filed on Mar. 27, 2018, now abandoned.

(60) Provisional application No. 62/477,184, filed on Mar. 27, 2017.

STORED ENERGY RELEASE TRIGGERED BY PIEZOELECTRIC ELEMENT

FIELD OF THE INVENTION

The present invention generally relates to a stored energy release triggered by a piezoelectric element, and more particularly to a stored energy release incorporated within a water activated release system (WARS).

BACKGROUND

Water activated release systems (WARS) are known in the art and are typically configured to trigger release of the WARS from a restraint, such as a harness, once the system is submersed in seawater. To that end, the WARS may include sensors which, when submersed in seawater, detect a change in resistance due to the salinity of the seawater. Upon sensing a threshold salinity/drop in resistance, a capacitor is charged via a battery pack so as to discharge a current to a pyrotechnic element and thereby cause the pyrotechnic element to ignite its chemical agents. Firing of the pyrotechnic chemical agents evolves a high pressure gas which actuates locking pins to withdraw into the WARS so as to release the locking pins from the restraint. Other wetting conditions, such as freshwater, fog, rain or humidity will not trigger firing of the pyrotechnic. While pyrotechnic WARS are presently in use, such pyrotechnic systems suffer from high production costs, complex assembly requirements and potential failure due to decomposition or fouling of the pyrotechnic chemical agents.

SUMMARY

The present invention addresses the above need by providing a WARS without need of a pyrotechnic chemical agent. In an embodiment, a stored energy release comprises an actuatable member slidably received within a housing. The actuatable member has an extended orientation wherein a portion of the actuatable member extends outwardly from the housing and a retracted orientation wherein the actuatable member resides within the housing. A biasing member is located between the actuatable member and the housing and biases the actuatable member to the retracted orientation. A shaft is within the housing with the actuatable member configured for sliding movement along the shaft. A retaining member is located between the actuatable member and the shaft and maintains the actuatable member in the extended orientation whereby potential energy is stored within the biasing member. A piezoelectric element selectively engages the retaining member to disable the retaining member and release the stored potential energy within the biasing member to place the actuatable member in the retracted orientation.

In a further aspect of the present invention, the actuatable member includes a pin puller coupled to a locking pin whereby the locking pin is configured to extend outwardly from the housing when the actuatable member is in the extended orientation. The shaft may also include a shoulder with the retaining member configured to engage the shoulder when the piezoelectric element is in a first state and wherein the retaining member disengages the shoulder when the piezoelectric element is in a second state such that the actuatable member is biased to the retracted orientation. The shaft may alternatively include tapered ends while the retaining member includes a ring configured to engage the tapered end when the piezoelectric element is in the first state and wherein the ring disengages the tapered end when the piezoelectric element is in a second state such that the actuatable member is biased to the retracted orientation.

In another aspect of the present invention, a water activated release system configured to automatically uncouple an occupant worn harness from a link when immersed in salt water comprises a body having a first end coupled to either the occupant worn harness of the link and a second end coupled to the other of the occupant worn harness of the link. The first end includes a power supply and at least one sensor in communication with an electronics package assembly (EPA) having an internal circuit with activated and deactivated states. The at least one sensor is configured to sense when the WARS is immersed in salt water and trigger the EPA to the activated state. The second end includes a stored energy release assembly comprising an actuatable member slidably received within a housing. The actuatable member has an extended orientation wherein a portion of the actuatable member extends outwardly from the housing to couple the WARS to the link and a retracted orientation wherein the actuatable member resides within the housing to uncouple the WARS from the link. A biasing member is located between a portion of the actuatable member and the housing. The biasing member is configured to bias the actuatable member to the retracted orientation. A shaft is within the housing with the actuatable member configured for sliding movement along the shaft. A retaining member is located between the actuatable member and the shaft. The retaining member is configured to maintain the actuatable member in the extended orientation whereby potential energy is stored within the biasing member. A piezoelectric assembly is configured to receive electrical power from the power supply when the EPA is triggered to the activated state. The piezoelectric assembly includes a piezoelectric element configured to selectively engage the retaining member to disengage the retaining member from the shaft and release the stored potential energy within the biasing member to bias the actuatable member to the retracted orientation whereby the occupant worn harness is uncoupled from the link.

In still another aspect of the present invention, the link is further coupled to a parachute riser or an overhead reel and the power supply is one or more batteries. Also, the at least one sensor is configured to detect a change in resistance due to the salinity of the salt water.

These and other features, aspects and advantages of the present invention will become better understood with reference to the following drawings, description and claims.

BRIEF DESCRIPTION OF DRAWINGS

For a more complete understanding and appreciation of this invention, and its many advantages, reference will be made to the following detailed description taken in conjunction with the accompanying drawings.

Corresponding reference characters indicate corresponding parts throughout the several views. The exemplifications set out herein illustrate currently preferred embodiments of the invention, and such exemplifications are not to be construed as limiting the scope of the invention in any manner.

DETAILED DESCRIPTION

Figures 1, 2:
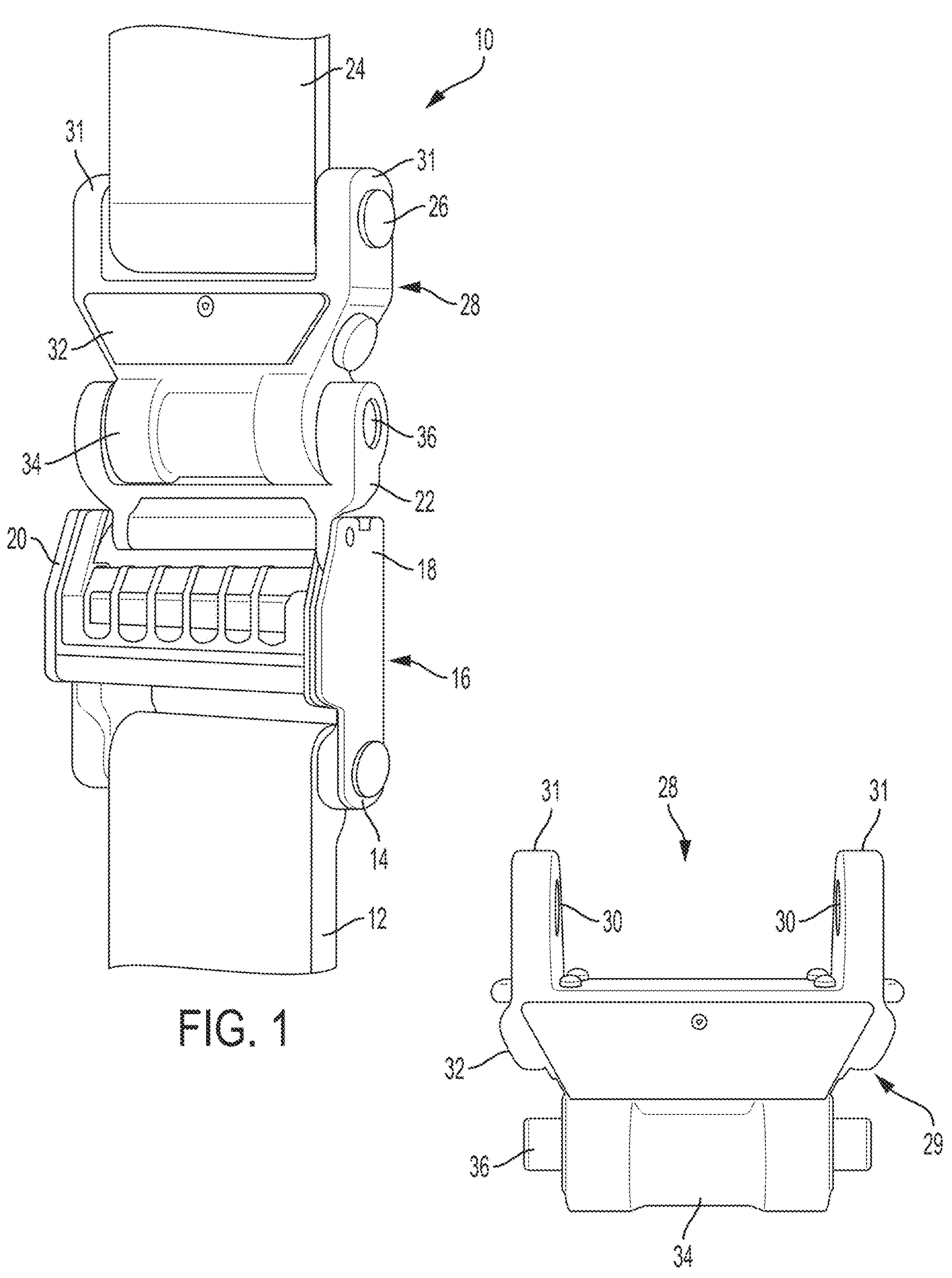
FIG. 1 is an environmental view of a harness system including a water activated release system in accordance with the present invention.
FIG. 2 is an isolated view of the water activated release system shown in FIG. 1.

FIG. 1 shows an exemplary environmental view of a harness configuration 10 which may suitably include a water activated release system (WARS). Harness configuration 10 may include a first strap 12 fixedly secured to a first end 14 of a manual release mechanism 16. First strap 12 may, for example, be secured to an occupant-worn harness system, such as but not limited to a parachute harness. The opposing second end 18 of manual release mechanism 16 may include a clasp 20 configured to receive a link 22. Pivoting clasp 20 enables release of link 22 from manual release mechanism 16. Link 22 may be coupled to a second strap 24. Second strap 24 may be secured to a further structure, such as an overhead reel (not shown) or may be a parachute riser of a parachute. In one instance, link 22 may be directly coupled to second strap 24 via pin 26 whereby second strap 24 would be released from first strap 12 only upon actuation of clasp 20 of manual release mechanism 16.

With additional reference to FIG. 2, to provide for increased safety, particularly in those applications anticipated to occur on, near or over seawater, WARS 28 may be interposed between strap 24 and link 22. In this instance, pin 26 is fixedly secured within openings 30 defined within lobes 31 which extend outwardly from first end 32 of body 29 of WARS 28. Second end 34 of WARS 28 may include opposing locking pins 36 configured to be releasably coupled to link 22. In this manner, upon submersion in seawater, WARS 28 may be activated to retract locking pins 36 and thereby disengage locking pins 36 from link 22. First strap 12 may then be decoupled from second strap 24 whereby the occupant is released from the overhead reel or parachute riser and canopy.

Figure 3:
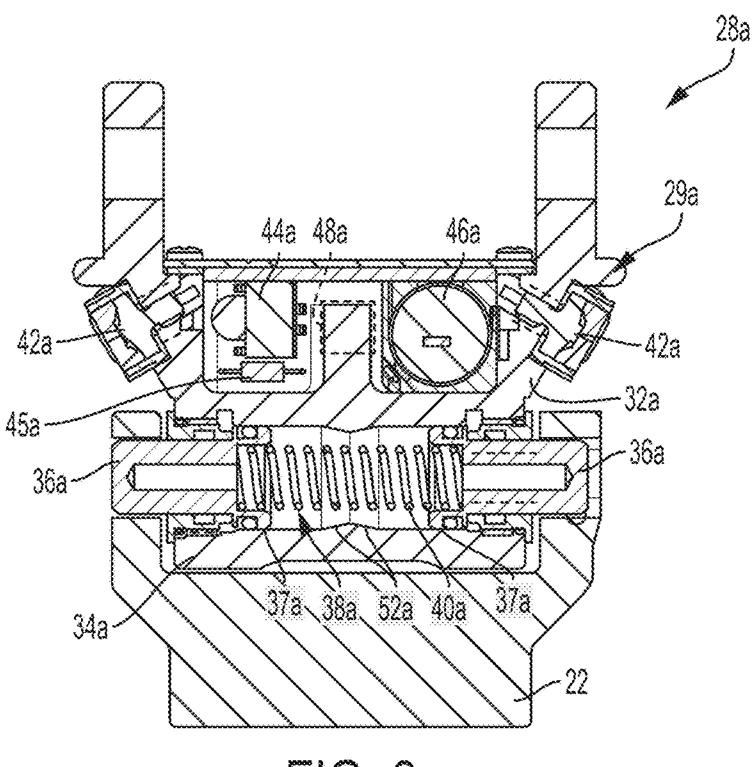
FIG. 3 is a cross section view of a prior art pyrotechnic water activated release system with the pyrotechnic in an unfired condition and locking pins extended.
Figure 4:
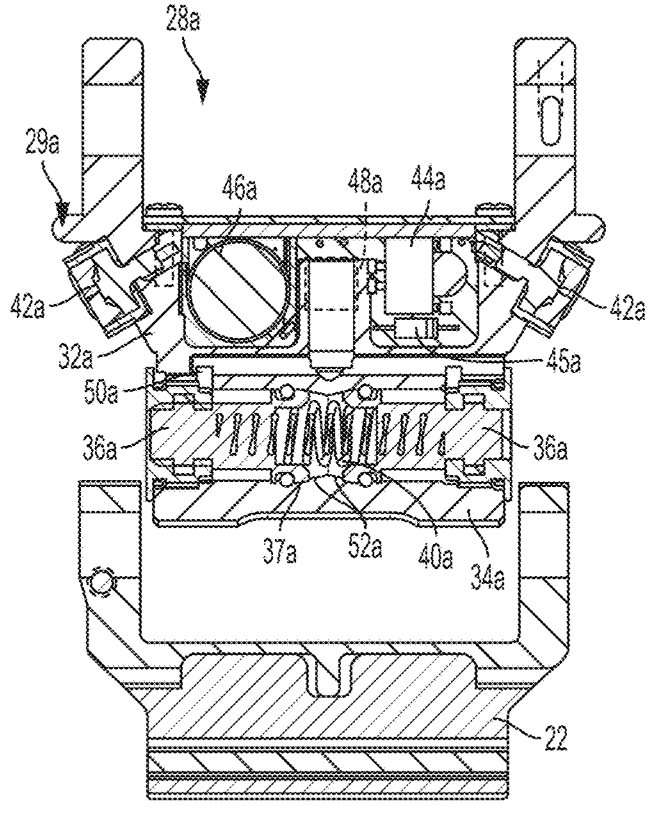
FIG. 4 is a cross section view of the prior art pyrotechnic water activated release system shown in FIG. 3 following firing of the pyrotechnic and retraction of the locking pins.

With attention to FIGS. 3 and 4, a prior art pyrotechnic WARS is generally indicated by reference number 28*a*. As can be seen, pyrotechnic WARS 28*a* includes a body 29*a* having opposing locking pins 36*a* slidably received within a channel 38*a* defined within second end 34*a*. Locking pins 36*a* are biased outwardly of second end 34*a*, such as by way of spring 40*a* so as to engage link 22. First end 32*a* of WARS 28*a* may be include sensors 42*a* configured to sense when WARS 28*a* is submersed within seawater, such as by a change in resistance between the sensors. Sensors 42*a* may communicate with an electronics package assembly (EPA) 44*a* whereby, when sensors 42*a* indicate seawater submersion, EPA 44*a* may close a circuit to charge capacitor 45*a*. Electrical power may be provided to sensors 42*a*, EPA 44*a* and capacitor 45*a* by one or more button cells 46*a*. Upon charging of capacitor 45*a*, a discharge current may then be directed to pyrotechnic element 48*a* so as to fire the pyrotechnic chemical agent contained therein and thereby generate a gas. The gas may then travel through gas path 50*a* and exert a force against head 37*a* of each locking pin 36*a*. The force exerted by the gas is sufficient to overcome the biasing force of spring 40*a* whereby locking pins 36*a* are driven inwardly within channel 38*a*. Channel 38*a* may further include a ramped surface 52*a* whereby, when driven by the evolved gas, heads 37*a* may be wedged against ramped surface 52*a* such that locking pins 36*a* may not be biased outwardly by spring 40*a* following a drop in gas pressure. In this manner, WARS 28*a* may then be freely removed from link 22 as shown in FIG. 4.

Figure 5:
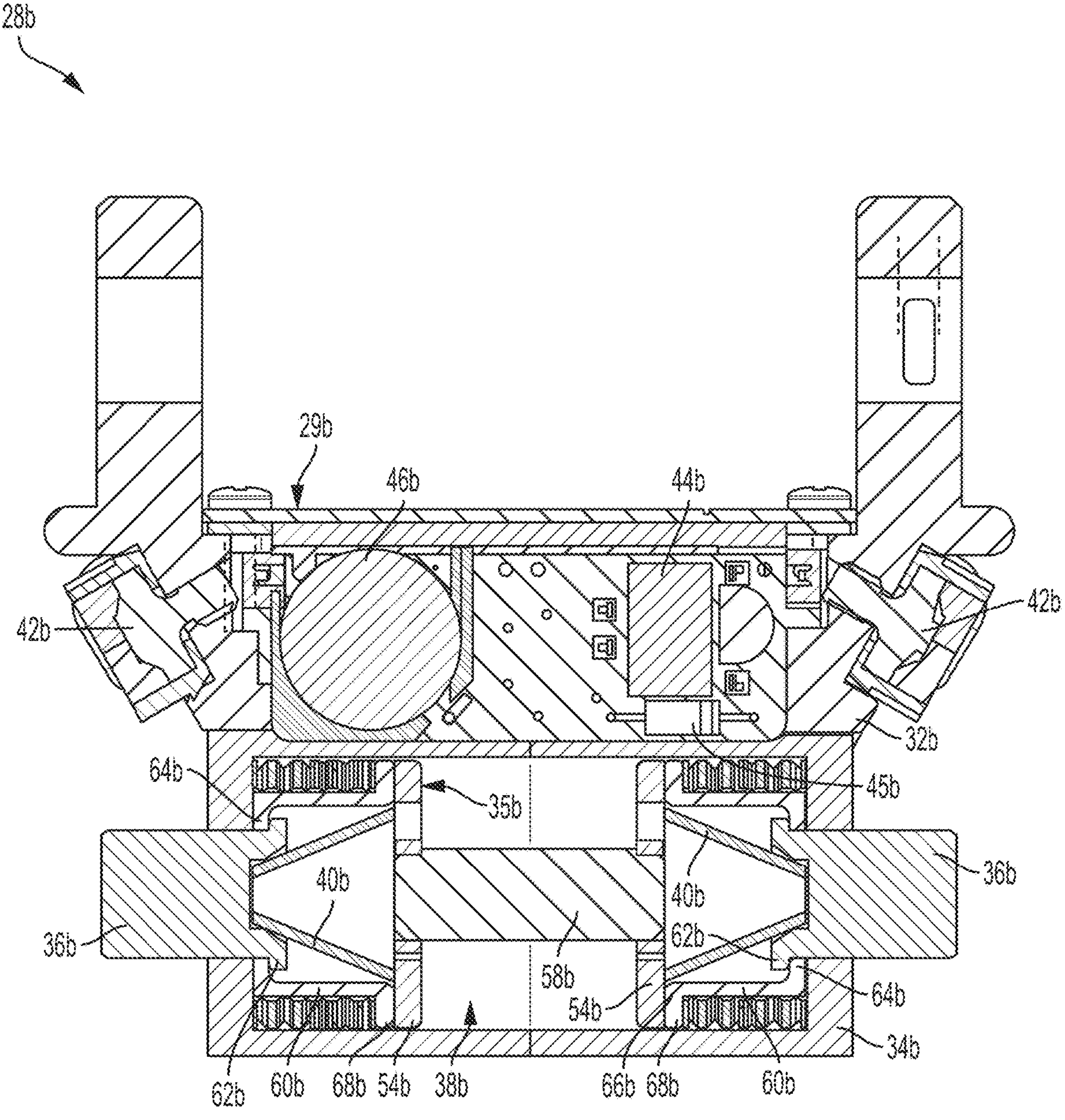
FIG. 5 is a cross section view of a piezoelectric water activated release system in accordance with an aspect of the present invention.

Turning now to FIGS. 5-9, an embodiment of a piezoelectric WARS 28*b* generally includes a body 29*b* having first and second ends 32*b*, 34*b*, respectively. It should be noted that first end 32*b* has been omitted from FIGS. 6, 8 and 9 for purposes of clarity. With reference to FIG. 5, first end 32*b* of WARS 28*b* may include sensors 42*b* configured to sense when WARS 28*b* is submersed within seawater. Sensors 42*b* may communicate with EPA 44*b*, when sensors 42*b* indicate seawater submersion. EPA 44*b* may then close a circuit to provide electrical power to piezoelectric assembly 35*b*, which will be discussed in greater detail below. Electrical power may be provided by one or more button cells 46*b*.

Figure 6:
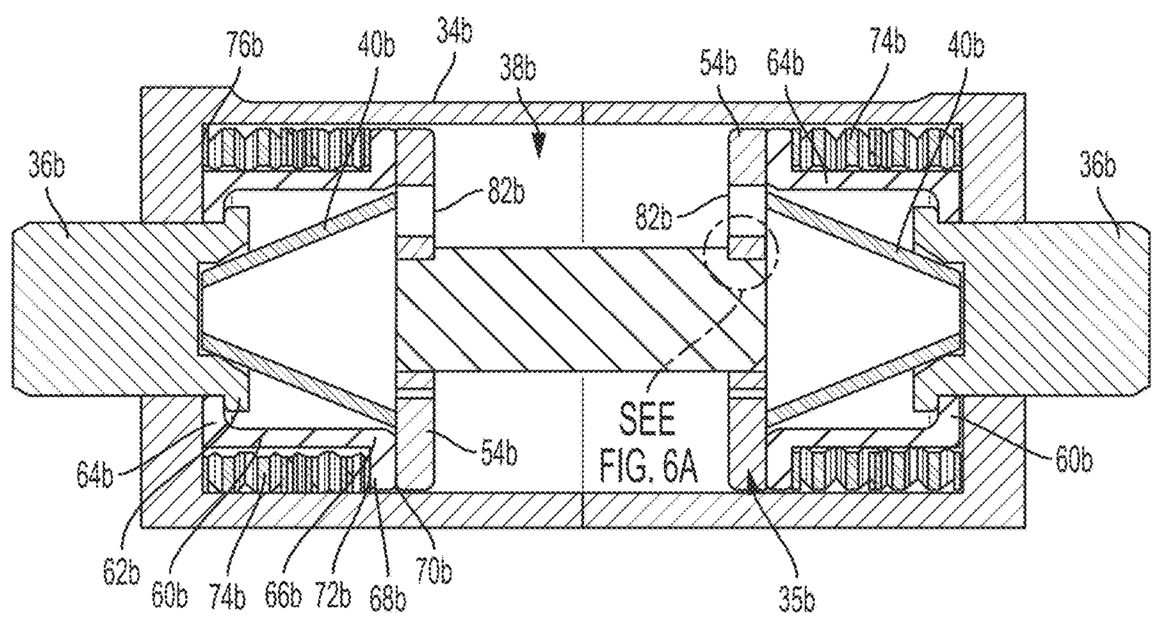
FIG. 6 is a cross section view of an isolated piezoelectric assembly within the piezoelectric water activated release system shown in FIG. 5.
Figure 6A:
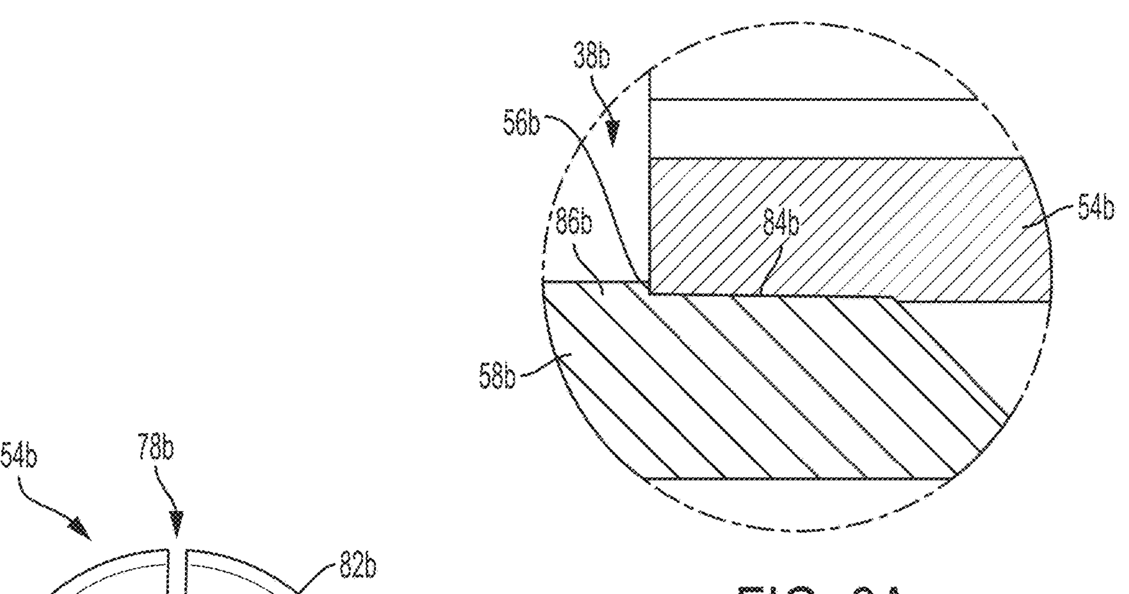
FIG. 6A is an expanded view of a pin holder and dowel within the piezoelectric assembly shown in FIG. 6.

Second end 34*b* may include a piezoelectric assembly 35*b* within channel 38*b* defined within the housing of second end 34*b*. Piezoelectric assembly 35*b* may comprise opposing locking pins 36*b* each biased outwardly from second end 34*b*, such as by way of a respective conical spring 40*b* acting against a respective retaining member, such as holder 54*b*. Each holder 54*b* abuts a respective shoulder 56*b* defined by central shaft or dowel 58*b* (FIGS. 6 and 6A). Piezoelectric assembly 35*b* may further include a respective pin puller 60*b* coupled to flanged end 62*b* of a respective locking pin 36*b* at a first end 64*b*. Together, each locking pin 36*b* and associated pin puller 60*b* may be referred to as an actuatable member. Opposing second end 66*b* of pin puller 60*b* includes a flange 68*b*. Inner surface 70*b* of flange 68*b* engages holder 54*b* while outer surface 72*b* is configured to engage a biasing member, such as wave spring 74*b*. The opposing end of each wave spring 74*b* seats against wall 76*b* of second end 34*b* such that wave spring 74*b* imparts an inward biasing force against pin puller 60*b*, and thus locking pins 36*b*. Potential energy is stored within each wave spring 74*b* and inward travel of locking pins 36*b* is prevented by engagement of holder 54*b* with shoulder 56*b*.

Figure 7:
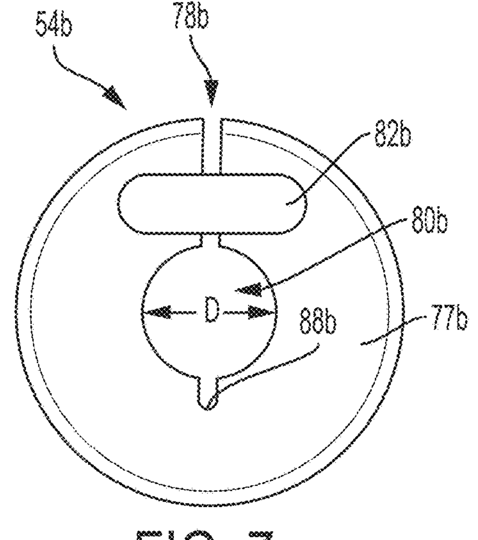
FIG. 7 is an isolated, front cross section view of the pin holder and piezoelectric element within the piezoelectric assembly shown in FIG. 6.
Figure 9:
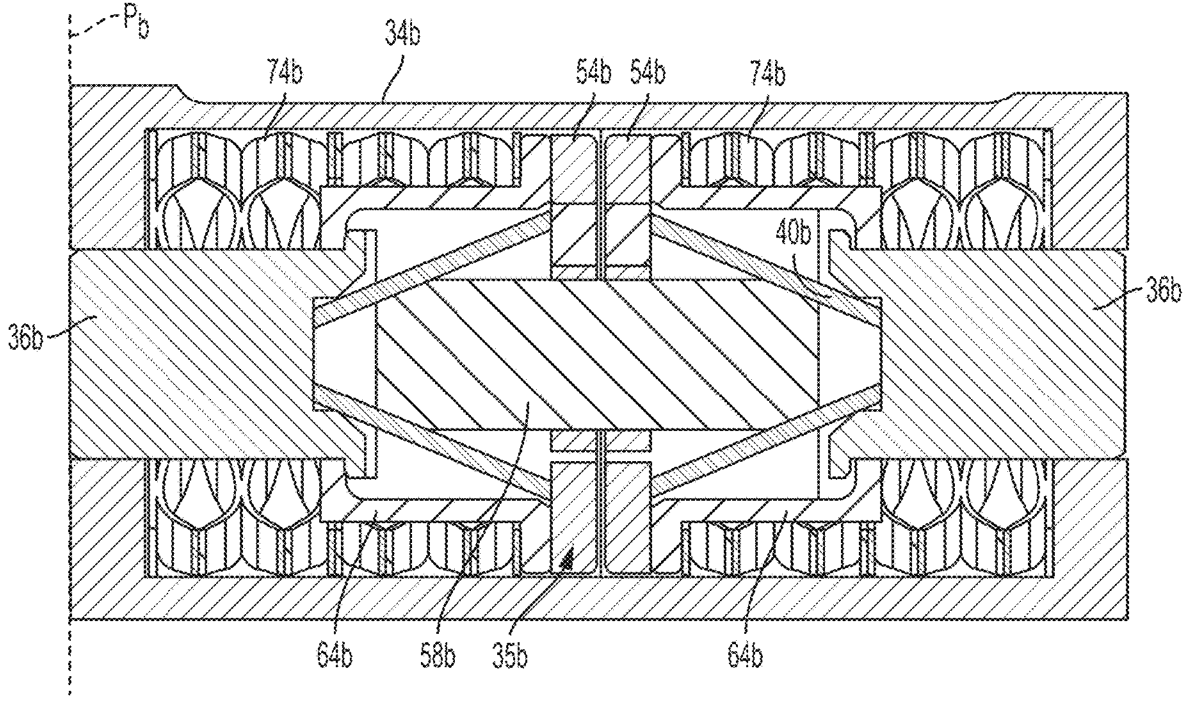
FIG. 9 is a cross section view of the piezoelectric water activated release system shown in FIG. 5 following actuation of the piezoelectric element and retraction of the locking pins.

FIG. 7 is an isolated view of a holder 54*b*. Holder 54*b* may include a generally C-shaped member 77*b* defining a narrow gap 78*b* and central opening 80*b*. A piezoelectric element 82*b* may extend across gap 78*b*. Piezoelectric element 82*b* may be initially configured to be in a compressed state while central opening 80*b* is proportioned such that its diameter D is substantially equal to the outer diameter of reduced portion 84*b* of central dowel 58*b* (see FIG. 6A) but less than the outer diameter of unreduced portion 86*b* of central dowel 58*b*. In this manner, piezoelectric element 82*b* may clamp holder 54*b* to reduced portion 84*b* of central dowel 58*b* and thereby prevent inward travel of holder 54*b* when under the biasing force of wave spring 74*b* as described above. However, following a sensed seawater submersion, discharge of capacitor 45*b* may cause expansion of piezoelectric element 82*b*. As a result, C-shaped member 77*b* may be deformed radially outward such that diameter D of central opening 80*b* may be expanded to be at least equal to the outer diameter of unreduced portion 84*b* of central dowel 58*b*. C-shaped member 77*b* may further include a hinge point, such as recess 88*b*, configured to assist control of the radially outward expansion of C-shaped member 77*b*. In this manner, and as shown in FIG. 9, holder 54*b* may translate linearly inward within channel 38*b* as the potential energy stored within wave springs 74*b* is released. As pin puller 60*b* is coupled to wave spring 74*b*, and locking pin 36*b* is coupled to pin puller 60*b*, locking pin 36*b* also translates inwardly within channel 38*b* such that locking pin 36*b* lies below plane $P_b$ defined by the terminus of second end 34*b*. As a result, WARS 28*b* may be decoupled from link 22 as described above.

Figure 8:
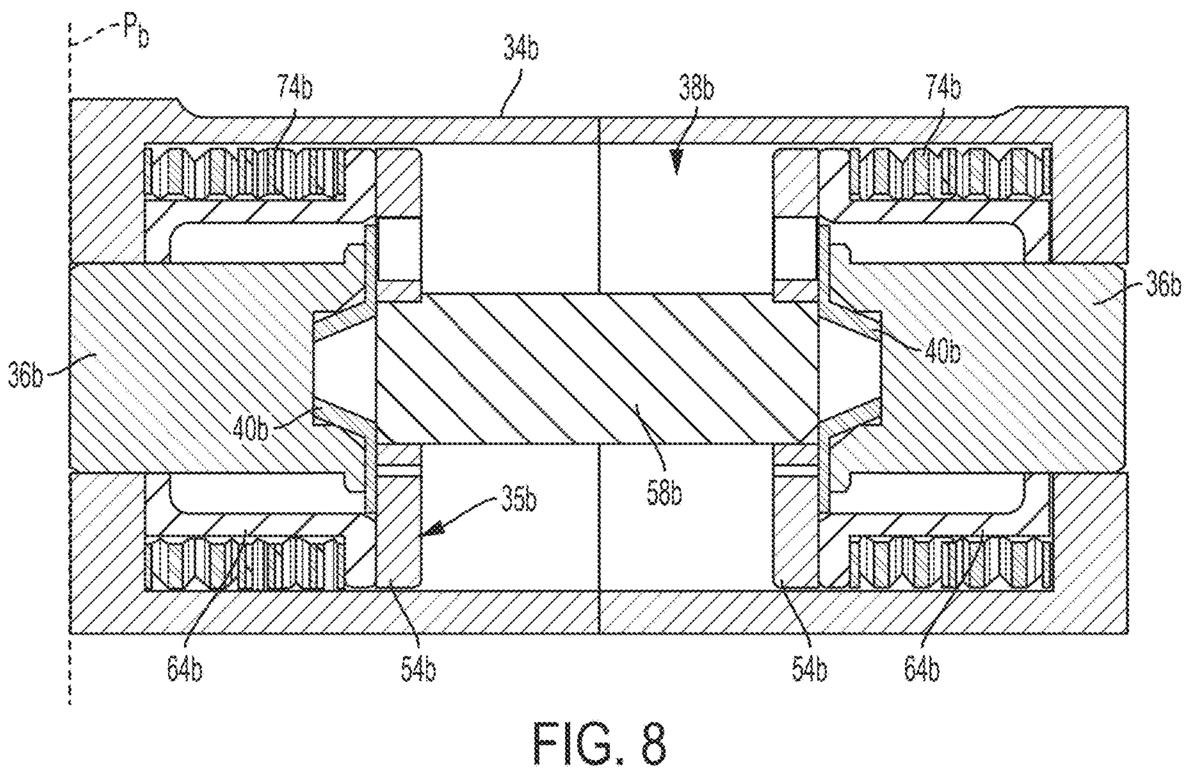
FIG. 8 is a cross section view of the piezoelectric water activated release system shown in FIG. 5 with the locking pins manually placed within the retracted orientation.

With reference to FIG. 8, WARS 28*b* may be manually coupled to link 22 without the use of tools. As shown in FIG. 8, locking pins 36*b* may be manually directed into second end 34*b* upon compression of conical springs 40*b*. Inward travel of holder 54*b* is prevented by engagement of C-shaped member 77*b* with shoulder 56*b* as described above. In this manner, WARS 28*b* may slide within link 22. With WARS 28*b* properly in place, compression of conical springs 40*b* is removed such that stored potential energy within conical springs 40*b* drives locking pins 36*b* outwardly such that locking pins 36*b* may engage link 22 so as to releasably couple WARS 28*b* to first strap 12.

It should be understood the steps of the method presented herein do not necessarily have to be in the order in which it is presented. It is also understood that when an element is referred to as being "on", "connected to/with", or "coupled to/with" another element, the element can be directly on, connected to/with or coupled to/with the other element or intervening elements may also be present.

While the invention has been described with reference to preferred embodiments, it will be understood by those skilled in the art that various changes may be made and equivalents may be substituted for elements or components thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the following claims.

What is claimed is:

1. A stored energy release comprising:

a) an actuatable member slidably received within a housing, the actuatable member having an extended orientation wherein a portion of the actuatable member extends outwardly from the housing and a retracted orientation wherein the actuatable member resides within the housing;

b) a biasing member located between a portion of the actuatable member and the housing, the biasing member configured to bias the actuatable member to the retracted orientation;

c) a shaft within the housing, the actuatable member configured for sliding movement along the shaft;

d) a retaining member located between the actuatable member and the shaft, the retaining member configured to maintain the actuatable member in the extended orientation whereby potential energy is stored within the biasing member; and e) a piezoelectric element configured to selectively engage the retaining member to disengage the retaining member from the shaft and release the stored potential energy within the biasing member to bias the actuatable member to the retracted orientation.

2. The stored energy release of claim 1 wherein the actuatable member includes a pin puller coupled to a locking pin, the locking pin configured to extend outwardly from the housing when the actuatable member is in the extended orientation.

3. The stored energy release of claim 2 further including a second biasing member having a first end coupled to the retaining member and a second end coupled to the locking pin.

4. The stored energy release of claim 1 wherein the shaft includes a shoulder, wherein the retaining member is configured to engage the shoulder when the piezoelectric element is in a first state and wherein the retaining member disengages the shoulder when the piezoelectric element is in a second state whereby the actuatable member is biased to the retracted orientation.

5. The stored energy release of claim 4 wherein the first state of the piezoelectric element is a compressed state.

6. The stored energy release of claim 1 wherein the shaft includes tapered ends, the retaining member including a ring configured to engage the tapered end when the piezoelectric element is in a first state and wherein the ring disengages the tapered end when the piezoelectric element is in a second state whereby the actuatable member is biased to the retracted orientation.

7. A water activated release system configured to automatically uncouple an occupant worn harness from a link when immersed in salt water, the water activated release system (WARS) comprising: a body having a first end coupled to either the occupant worn harness of the link and a second end coupled to the other of the occupant worn harness of the link, wherein the first end includes a power supply and at least one sensor in communication with an electronics package assembly (EPA) having an internal circuit with activated and deactivated states, wherein the at least one sensor is configured to sense when the WARS is immersed in salt water and trigger the EPA to the activated state, and wherein the second end includes a stored energy release assembly comprising:

a) an actuatable member slidably received within a housing, the actuatable member having an extended orientation wherein a portion of the actuatable member extends outwardly from the housing to couple the WARS to the link and a retracted orientation wherein the actuatable member resides within the housing to uncouple the WARS from the link;

b) a biasing member located between a portion of the actuatable member and the housing, the biasing member configured to bias the actuatable member to the retracted orientation;

c) a shaft within the housing, the actuatable member configured for sliding movement along the shaft;

d) a retaining member located between the actuatable member and the shaft, the retaining member configured to maintain the actuatable member in the extended orientation whereby potential energy is stored within the biasing member; and e) a piezoelectric assembly configured to receive electrical power from the power supply when the EPA is triggered to the activated state, wherein the piezoelectric assembly includes a piezoelectric element configured to selectively engage the retaining member to disengage the retaining member from the shaft and release the stored potential energy within the biasing member to bias the actuatable member to the retracted orientation whereby the occupant worn harness is uncoupled from the link.

8. The water activated release system of claim 7 wherein the link is further coupled to a parachute riser or an overhead reel.

9. The water activated release system of claim 7 wherein the power supply is one or more batteries.

10. The water activated release system of claim 7 wherein the at least one sensor is configured to detect a change in resistance due to the salinity of the salt water.

* * * * *